US011572264B2

(12) United States Patent
Drocco

(10) Patent No.: US 11,572,264 B2
(45) Date of Patent: Feb. 7, 2023

(54) DOSING MACHINE FOR DOSING FLUID PRODUCTS SUCH AS DYES FOR PAINTS OR THE LIKE, WITH A DEVICE FOR INDIVIDUALLY MEASURING THE LEVEL OF THE FLUID PRODUCTS

(71) Applicant: DROMONT S.p.A., Grinzane Cavour (IT)

(72) Inventor: Luca Drocco, Alba (IT)

(73) Assignee: DROMONT S.p.A.

( * ) Notice: Subject to any disclaimer, the term of this patent is extended or adjusted under 35 U.S.C. 154(b) by 97 days.

(21) Appl. No.: 16/929,185

(22) Filed: Jul. 15, 2020

(65) Prior Publication Data

US 2021/0017008 A1 Jan. 21, 2021

(30) Foreign Application Priority Data

Jul. 16, 2019 (IT) .......................... 102019000011880

(51) Int. Cl.
*B67C 3/20* (2006.01)
*B01F 33/84* (2022.01)
*B01F 101/30* (2022.01)

(52) U.S. Cl.
CPC ............ *B67C 3/20* (2013.01); *B01F 33/8442* (2022.01); *B01F 2101/30* (2022.01)

(58) Field of Classification Search
CPC ....................................................... G01F 23/74
See application file for complete search history.

(56) References Cited

U.S. PATENT DOCUMENTS

| 2,923,438 | A | * | 2/1960 | Logan | ................... | B01F 33/841 |
| | | | | | | 222/2 |
| 5,056,049 | A | * | 10/1991 | O'Neill | ................... | G01F 23/80 |
| | | | | | | 702/55 |
| 2004/0065682 | A1 | | 4/2004 | Floyd et al. | | |
| 2016/0199866 | A1 | | 7/2016 | Essing et al. | | |
| 2018/0111147 | A1 | * | 4/2018 | Strong | ................. | B65D 83/005 |

FOREIGN PATENT DOCUMENTS

| EP | 0764835 A2 | 3/1997 |
| EP | 2787402 A1 | 10/2014 |

OTHER PUBLICATIONS

International Search report dated Mar. 25, 2020. 7 pages.

\* cited by examiner

*Primary Examiner* — Timothy L Maust
*Assistant Examiner* — Christopher M Afful
(74) *Attorney, Agent, or Firm* — RMCK Law Group PLC

(57) ABSTRACT

A dosing machine for dosing fluid products includes: containers having vertical longitudinal axes and configured to contain fluid products, rotary stirring elements located inside respective containers and operable in rotation by electric motors, and a dispensing head having nozzles connected to respective containers, where each container is associated with a level measuring device having: a floater containing a permanent magnet and free to move inside the container, a magnetic detector arranged outside the container, and having magnetic sensors spaced apart from each other in a vertical direction and each of which is configured to detect a variation in a magnetic field caused by passage in its proximity of said floater, and a control unit which analyzes signals provided by the magnetic sensors to detect a fluid level inside the container and passage of the floater in a vicinity of one or more of said magnetic sensors.

7 Claims, 5 Drawing Sheets

DOSING MACHINE FOR DOSING FLUID PRODUCTS SUCH AS DYES FOR PAINTS OR THE LIKE, WITH A DEVICE FOR INDIVIDUALLY MEASURING THE LEVEL OF THE FLUID PRODUCTS

CROSS-REFERENCE TO RELATED APPLICATION

This application claims priority to Italian Patent Application No. 102019000011880 filed Jul. 16, 2019. The disclosure of the above application is incorporated herein by reference in its entirety.

FIELD OF THE INVENTION

The present invention relates to dosing machines for dispensing dosed amounts of fluid products.

The invention was developed in particular with a view to its application to dosing machines for dispensing dyes for preparing paints. In the following description, reference will be made to this specific application field without, however, losing generality.

DESCRIPTION OF THE PRIOR ART

A dosing machine for dispensing dyes for preparing paints generally includes a plurality of containers with a vertical axis containing respective dyes. The dosing machine comprises a dispensing head having a plurality of nozzles connected to respective containers. A plurality of dispensing pumps feed dosed quantities of dyes from the containers to the respective nozzles of the delivery head.

The containers are normally provided with respective stirring devices, which keep the dyes contained inside the containers moving, according to a predefined periodicity, to avoid the formation of stratifications, deposits, incrustations, etc.

In these dosing machines it is important that the levels of the dyes contained in the various containers are always above a pre-established minimum level to prevent the dispensing pumps from sucking air.

The level of the dyes inside the containers is usually determined by a control unit of the dosing machine by means of a calculation that subtracts the volumes progressively dispensed from the initial volumes set by an operator. The operator must set the volume of dye contained in each container after each refilling operation on a machine control panel. During operation, the machine control unit progressively subtracts the volumes dispensed from the initial volumes of each container, and provides an estimate of the level of fluid present in each container.

This system allows acceptable precisions to be reached, on condition that the operator accurately indicates the level reached after each reloading operation.

The system for determining the level of dyes based on the calculation of the volumes dispensed is subject to human errors that can lead to a misalignment between the calculated level and the actual level.

For example, an operator error in assessing the volume of dye contained in the container at the end of the reloading, or an error in the value entered into the machine control panel may lead to complete emptying of a container, with the risk that the relative dispensing pump sucks air.

In certain cases, the operator can also intentionally set an incorrect value of the effective level into the machine control system to force a dosage even when the dye level is below the level at which the machine control system inhibits further dispensing.

For these reasons it would therefore be desirable to have a system for detecting the level of the dyes in the containers of the dosing machines that does not require manual intervention.

On the other hand, most of the systems known for measuring the level of a liquid in a container cannot be used in a dosing machine because they would interfere with the rotating stirring devices that keep the dyes moving inside the containers, and because the physico-chemical properties of the dyes restrict the types of detection systems that can be used.

OBJECT AND SUMMARY OF THE INVENTION

The object of the present invention is to provide a dosing machine that overcomes the problems of the prior art.

According to the present invention, this object is achieved by a dosing machine having the characteristics forming the subject of claim 1.

The claims form an integral part of the disclosure provided here in relation to the invention.

BRIEF DESCRIPTION OF THE DRAWINGS

The present invention will now be described in detail with reference to the attached drawings, given purely by way of non-limiting example, wherein.

It will be appreciated that the various figures may not be reproduced to the same scale, and that some components may be removed to simplify the understanding of the figures.

DETAILED DESCRIPTION

Figure 1:
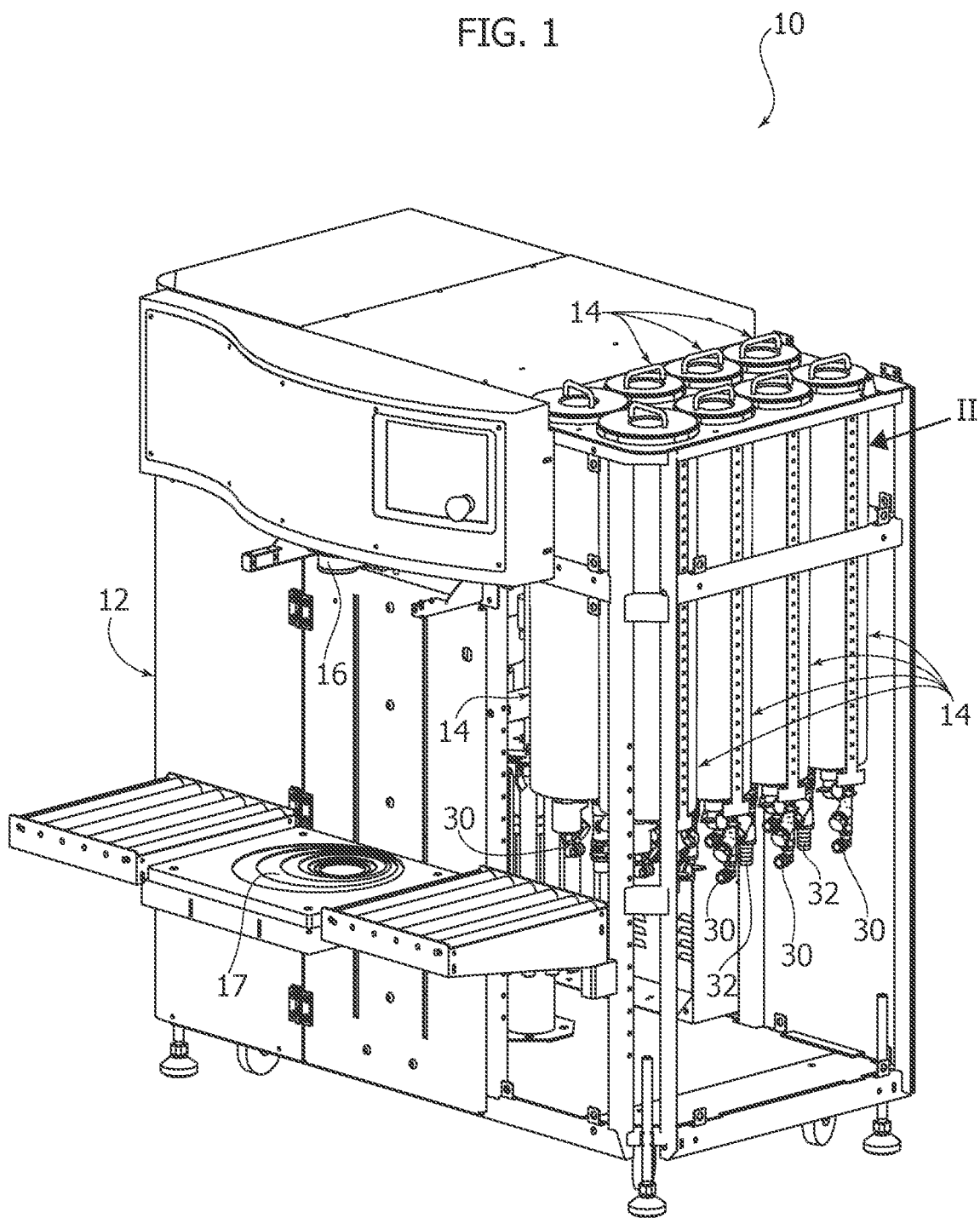
FIG. 1 is a perspective view of a dosing machine, with some components removed.

With reference to FIG. 1, numeral 10 indicates a dosing machine for dispensing dosed quantities of fluid products, such as, for example, dyes for preparing paints.

The machine 10 comprises a frame 12 which supports a plurality of containers 14 which, during use, are filled with respective dyes.

The machine 10 comprises a delivery head 16 having a plurality of nozzles connected to respective containers 14 by means of a dosing circuit comprising a plurality of ducts, and a plurality of dispensing pumps which withdraw the quantities of dyes to be dosed from the containers 14, and send them to the respective nozzles of the delivery head 16. In FIG. 1, the dosing circuit is not illustrated to simplify the representation. The dosing circuit is known per se, and is outside the scope of the present invention.

The dyes fed by the dosing circuit are dispensed from the head 16 into a container (not shown) resting on a base 17, in which the dyes are mixed with diluents (water or solvents) for preparing paints.

Figure 2:
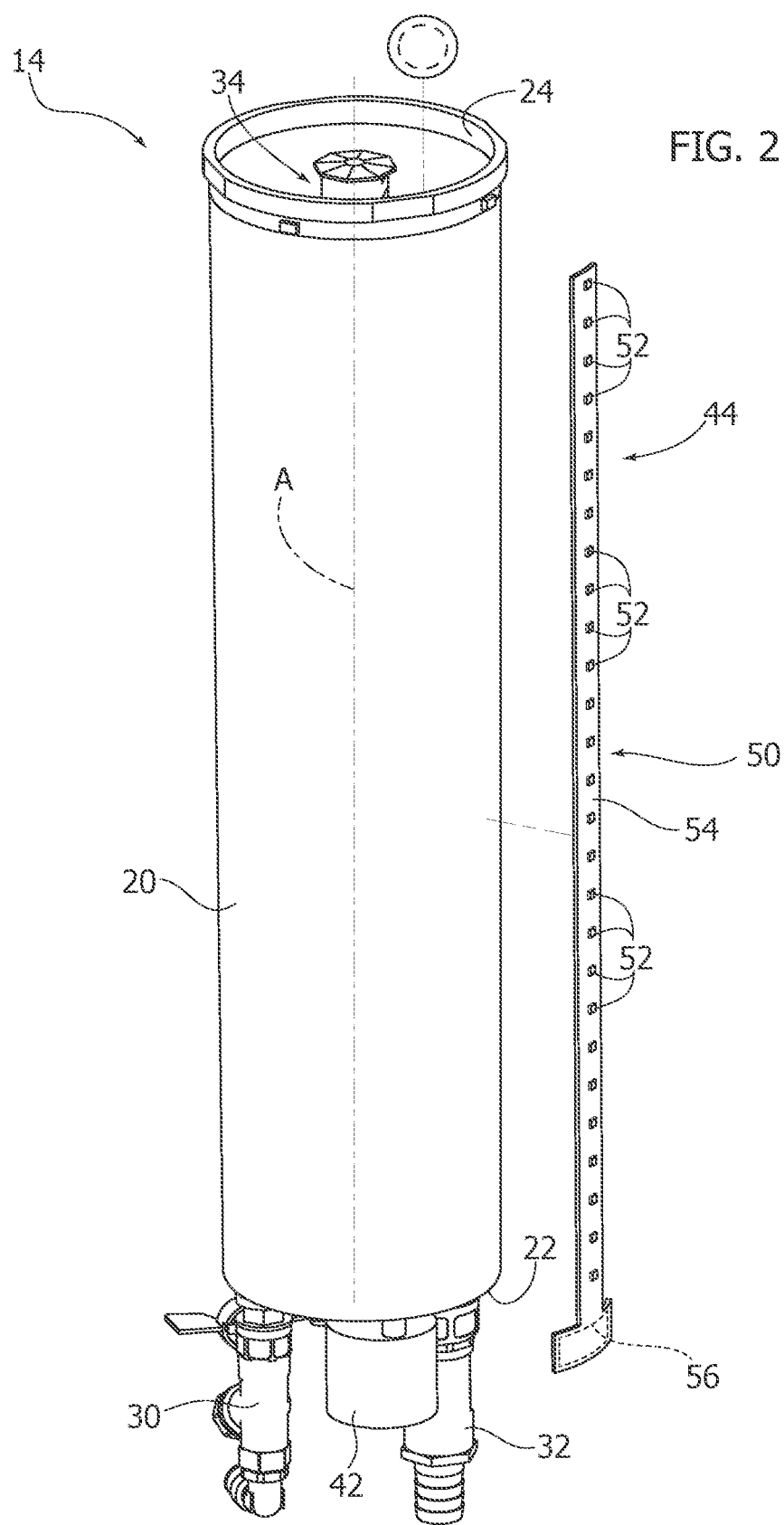
FIG. 2 is an exploded perspective view of a container for fluid products indicated by the arrow II in FIG. 1.
Figure 3:
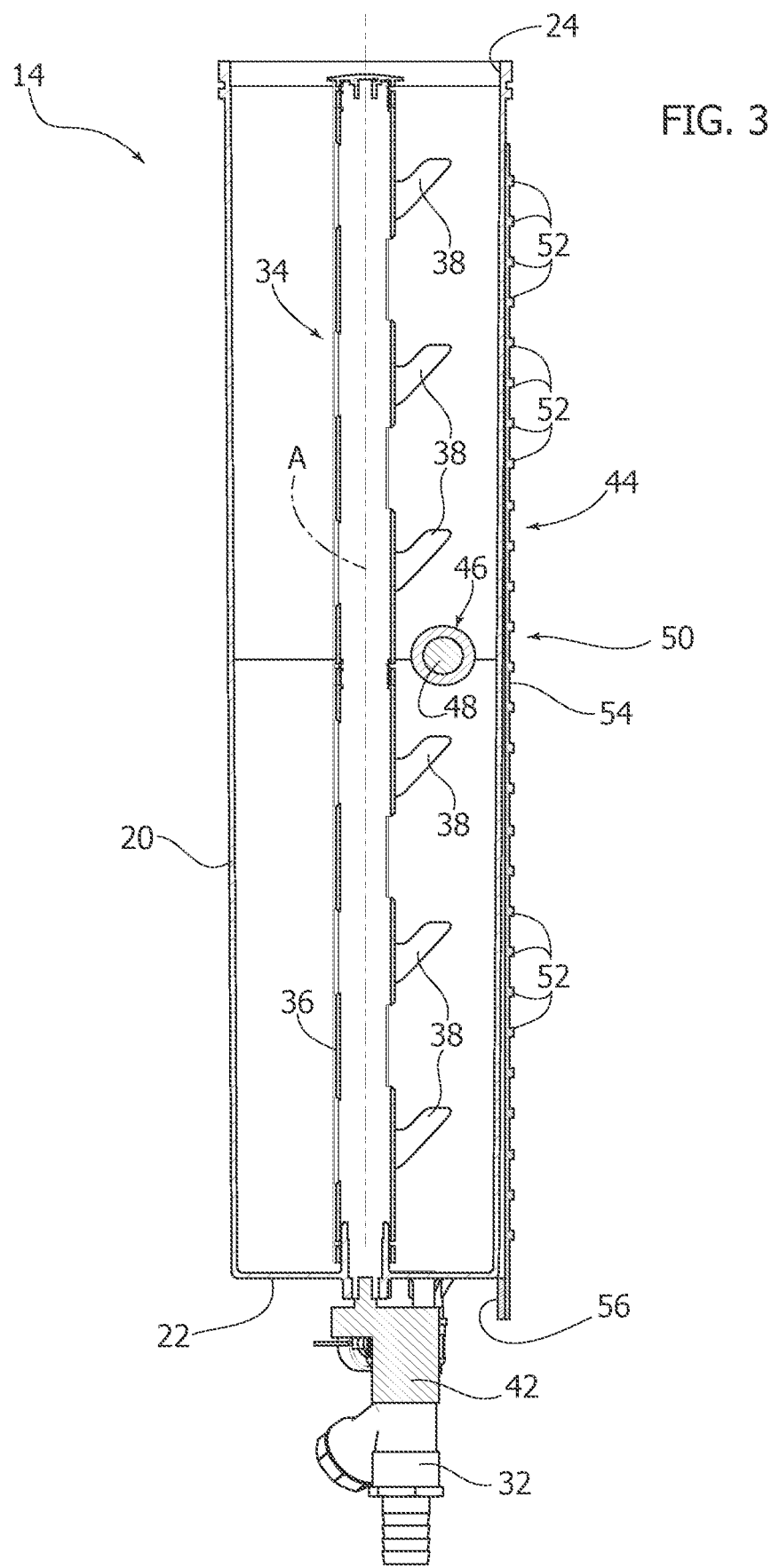
FIG. 3 is an axial cross-section of the container of FIG. 2, and FIGS. 4 and 5 are cross-sections of the container of FIG. 3 in different positions.

With reference to FIGS. 2 and 3, each of the containers 14 has an elongated shape along a longitudinal axis A. The containers 14 are arranged in the frame 12 of the machine 10 with the respective longitudinal axes A oriented vertically.

Each container 14 has a side wall 20, for example, cylindrical, a bottom wall 22 and an upper opening 24 through which the container 14 can be filled with a fluid product, such as, for example, a dye.

The bottom wall 22 of the container 14 has at least one opening associated with a valve 30. Only one opening may be provided in the case of dosing circuits in which suction and recirculation share the same line. Instead, two openings may be provided when suction and recirculation are on separate lines. Furthermore, in each container 14, a second closing valve 32 may be provided to intercept the dye in the case of replacement of the container during maintenance operations.

Figure 4:
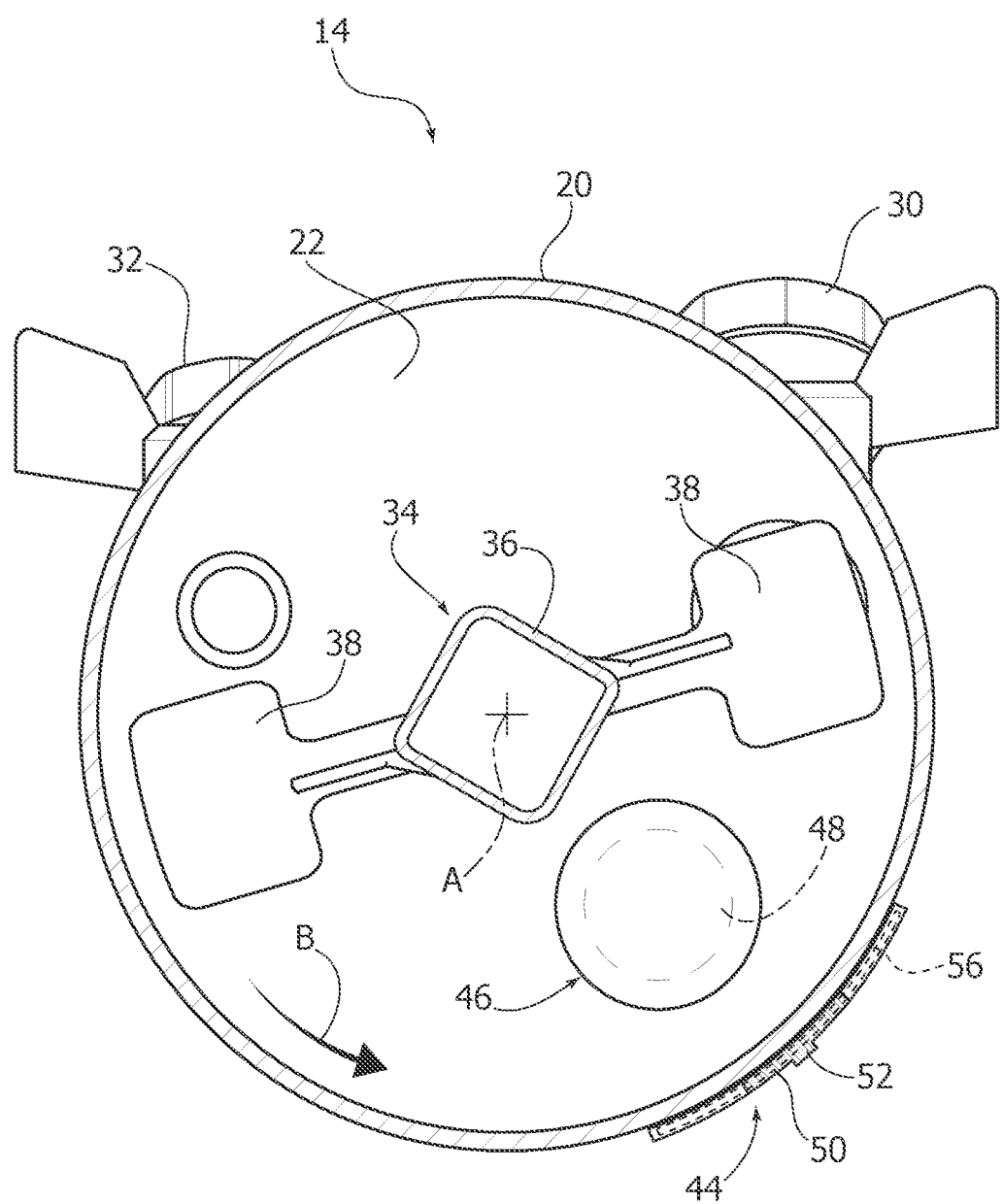
Figure 5:
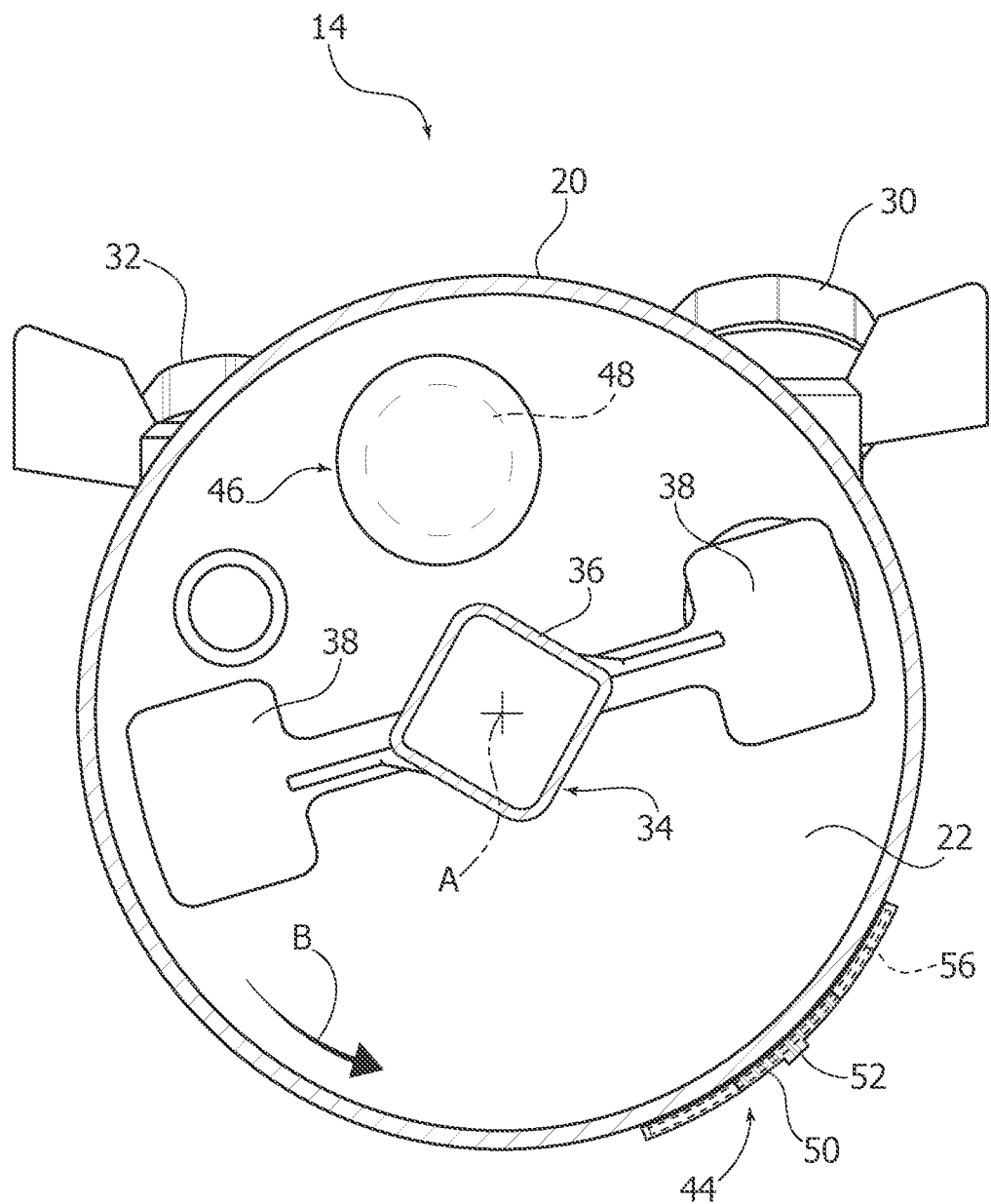

With reference to FIGS. 3-5, each container 14 comprises a respective stirring element 34 rotatable around the respective longitudinal axis A, which keeps the dye moving inside the container 14 according to a predefined periodicity, to avoid sedimentation, stratification or deposits of the dye. The stirring element 34 comprises a central tubular element 36 elongated in the longitudinal direction A, and a plurality of paddles 38 protruding radially from the central tubular element 36. The stirring element 34 is driven into rotation around the axis A by an electric motor 42, which can be associated with a gearbox, located below the bottom wall 22 of the container 14.

With reference to FIGS. 2-5, each container 14 is associated with a level measuring device 44 configured to measure the level of the fluid inside the respective container 14.

Each level measuring device 44 comprises a floater arranged inside the container 14, and containing a permanent magnet 48. The permanent magnet 48 can, for example, be an iron-boron-neodymium magnet (or the like) having a notable intensity of the magnetic field.

The floater 46 is totally unrestricted by the stirring element 34 and from any other structure present inside the container 14, and is therefore free to move inside the container 14. During operation, the floater 46 is pushed into rotation around the longitudinal axis A of the container 14 by the rotatable stirring element 34. As can be seen in FIGS. 4 and 5, the rotation of the blades 38 in the direction B or the rotary movement of the fluid inside the container 14 cause the floater 46 to move around the longitudinal axis A.

The floater 46 has a specific weight so that it is always near the free surface of the dye. The floater 46 can have any shape, for example, spherical or cylindrical. In a direction orthogonal to the longitudinal axis A of the container 14, the floater 46 occupies a substantial part of the distance between the central tubular member 36 of the stirring element 34 and the side wall 20 of the container 14, to prevent the floater 46 from getting stuck between the inner edge of the blades and the outer surface of the tubular element 36.

Each level measuring device 44 comprises a magnetic detector 50 arranged outside the container 14. The magnetic detector 50 may, for example, be fixed onto the outer surface of the side wall 20 of the container 14. The magnetic detector 50 may be glued, screwed, comolded etc. on the outer surface of the side wall 20 of the container 14. The magnetic detector 50 may extend along a generating line of the outer surface of the container 14. The magnetic detector 50 can be extended, depending on the specific case, over the entire useful length of the container 14, or only at a lower part of the container 14.

The magnetic detector 50 comprises a plurality of magnetic sensors 52 spaced apart from each other in a direction parallel to the longitudinal axis A of the container 14. The magnetic detector 50 may comprise a strip-shaped printed circuit 54 on which the magnetic sensors 52 are arranged. The magnetic sensors 52 can be spaced apart at regular intervals (for example, in the order of 1-3 cm) in a direction parallel to the longitudinal axis A of the container 14.

Each of the magnetic sensors 52 is configured to detect a variation in the magnetic field caused by the passage in their vicinity of the magnet 48 contained in the floater 46. The magnetic sensors 52 can, for example, be Hall effect sensors.

Each level measuring device 44 comprises a control unit 56 which analyzes the signals provided by the magnetic sensors 52. The control unit 56 can be arranged at a lower portion of the printed circuit 54. All the control units 56 of the various level measurers 44 are connected to the central control unit of the dosing machine 10, for example, via a Controller Area Network (CAN) bus or similar data transmission system.

The control unit 56 is able to detect the fluid level inside the container as a function of which of the sensors 52 detect a variation in the magnetic field due to the passage in their vicinity of the magnet 48 contained in the floater 46.

An advantageous consequence of the fact that the floater 46, during operation, moves around the A axis is that, with the same level measuring device 44, it is also possible to effectively diagnose a possible failure of the stirring element 34.

The control unit 56 is, in fact, able to detect the periodic passage of the floater 46 in the vicinity of one or more of the magnetic sensors 52. In the case of blocking of the stirring element 34 due to a mechanical or electrical fault, the floater 46 does not cyclically pass near the magnetic sensors 52. In this case, the control unit 56 does not detect a periodic variation of the magnetic field on one or more of the magnetic sensors 52, which allows diagnosis of the failure of the stirring element 34.

This diagnostic function is highly appreciated by users, as this type of failure often goes unnoticed, but is potentially a source of problems because it could cause progressive drying of the dyes.

The fact that each container 14 is provided with its own control unit 56 can allow selective activation of the stirring elements 34 of the various containers 14. The possibility of selectively activating the stirring elements 34 of the various containers 14 can be useful in the case of dyes which, due to their chemical and rheological characteristics, cannot withstand frequent stirring cycles or, conversely, require more frequent cycles than other dyes.

Of course, without prejudice to the principle of the invention, the details of construction and the embodiments can be widely varied with respect to those described and illustrated, without thereby departing from the scope of the invention as defined by the claims that follow.

The invention claimed is:

1. A dosing machine for dosing fluid products, comprising:
    a plurality of containers having respective vertical longitudinal axes, configured to contain respective fluid products,
    a plurality of rotary stirring elements located inside respective containers of the plurality of containers and operable in rotation by respective electric motors, and
    a dispensing head having a plurality of nozzles connected to the respective containers, wherein each of said plurality of containers is associated with a respective level measuring device comprising:
    a floater containing a permanent magnet and arranged inside the respective container, wherein the floater is free to move inside the respective container and, during operation, is moved in a cyclical manner around the vertical longitudinal axis of the respective container by a respective stirring element of the plurality of stirring elements, a magnetic detector arranged outside the respective container and comprising a plurality of magnetic sensors spaced apart from each other in a vertical direction and each of which is configured to detect a variation in a magnetic field caused by passage of said floater in its proximity, and a control unit configured to analyze signals provided by said plurality of magnetic sensors to detect a level of the fluid product inside the respective container, and a periodic passage of the floater in a vicinity of one or more of said plurality of magnetic sensors to provide a diagnosis of a failure of rotational movement of the stirring elements.

2. The dosing machine according to claim 1, wherein said magnetic detector comprises a strip-shaped printed circuit on which said plurality of magnetic sensors are arranged.

3. The dosing machine according to claim 1, wherein said magnetic detector is fixed on an outer surface of a side wall of the respective container.

4. The dosing machine according to claim 1, wherein said magnetic detector extends along a side wall of the respective container.

5. The dosing machine according to claim 1, wherein said magnetic detector extends over substantially an entire length of the respective container.

6. The dosing machine according to claim 1, wherein, in a direction orthogonal to the vertical longitudinal axis of the respective container, said floater occupies a substantial part of a distance between a central tubular member of the stirring element and a side wall of the container.

7. The dosing machine according to claim 1, wherein the control units associated with the respective containers of the plurality of containers are configured to selectively actuate the respective stirring elements.

* * * * *